US008321398B2

(12) United States Patent
Aumann et al.

(10) Patent No.: US 8,321,398 B2
(45) Date of Patent: Nov. 27, 2012

(54) METHOD AND SYSTEM FOR DETERMINING RELEVANCE OF TERMS IN TEXT DOCUMENTS

(75) Inventors: Yehonatan Aumann, Jerusalem (IL); Orgad Keller, Tel Aviv (IL); Ran Shlivinski, Ramat-Hasharon (IL)

(73) Assignee: Thomson Reuters (Markets) LLC, New York, NY (US)

( * ) Notice: Subject to any disclaimer, the term of this patent is extended or adjusted under 35 U.S.C. 154(b) by 290 days.

(21) Appl. No.: 12/459,475

(22) Filed: Jul. 1, 2009

(65) Prior Publication Data

US 2011/0004606 A1 Jan. 6, 2011

(51) Int. Cl.
*G06F 17/30* (2006.01)
(52) U.S. Cl. .................. 707/706; 707/749
(58) Field of Classification Search .............. 707/706, 707/749
See application file for complete search history.

(56) References Cited

U.S. PATENT DOCUMENTS

| | | | | |
|---|---|---|---|---|
| 6,405,188 | B1 * | 6/2002 | Schwartz et al. | 707/706 |
| 6,442,545 | B1 | 8/2002 | Feldman et al. | |
| 6,523,025 | B1 * | 2/2003 | Hashimoto et al. | 1/1 |
| 6,532,469 | B1 | 3/2003 | Feldman et al. | |
| 6,668,251 | B1 * | 12/2003 | Goldberg | 707/706 |
| 6,701,318 | B2 * | 3/2004 | Fox et al. | 707/706 |
| 6,785,688 | B2 * | 8/2004 | Abajian et al. | 707/700 |
| 6,944,612 | B2 * | 9/2005 | Roustant et al. | 707/706 |
| 7,113,943 | B2 * | 9/2006 | Bradford et al. | 707/739 |
| 7,165,080 | B2 * | 1/2007 | Kotcheff et al. | 707/706 |
| 7,243,092 | B2 | 7/2007 | Woehler et al. | |
| 7,257,570 | B2 * | 8/2007 | Riise et al. | 707/706 |
| 2004/0027349 | A1 | 2/2004 | Landau et al. | |
| 2006/0253273 | A1 | 11/2006 | Feldman et al. | |
| 2008/0319973 | A1 * | 12/2008 | Thambiratnam et al. | 707/5 |
| 2010/0094615 | A1 * | 4/2010 | Roh et al. | 704/2 |

OTHER PUBLICATIONS

Gerard Salton et al, Improving Retrieval Performance by Reference Feedback, Journal of the American Society for Information Science, 1990, 41(4):288-297.
Gerard Salton et al, Term-Weighting Approaches in Automatic Text Retrieval, Information Processing & Management, 1988, vol. 24, No. 5, pp. 513,523.
Karen Sparck Jones, A Statistical Interpretation of Term Specificity and its Application in Retrieval, 1972, Journal of Documentation, vol. 60, No. 5, pp. 493-502.
Claire Cardie, Empirical Methods in Information Extraction.

\* cited by examiner

*Primary Examiner* — Kim Nguyen
(74) *Attorney, Agent, or Firm* — Valenti Hanley & Robinson, PLLC; Kevin T. Duncan

(57) ABSTRACT

The present invention provides a corpus-independent method for determining relevancy of terms to content of text appearing in a document by analyzing the document itself. Conventional information extraction, or other methods, may be applied to a document to generate a list of terms. The invention analyzes the document using relevancy scoring algorithms to determine a term relevancy score representing the term's relevance to the text contained in the document. The scores, including an aggregate score, may be normalized in the process. Based on relevancy scoring, terms are then ranked and further processed. In this manner relevancy is determined based on the subject document itself and by analyzing the occurrences and locations of the terms within the document. Additional techniques may be applied to relate the relevancy scores generated by the present invention to a corpus or collection of documents.

49 Claims, 2 Drawing Sheets

METHOD AND SYSTEM FOR DETERMINING RELEVANCE OF TERMS IN TEXT DOCUMENTS

FIELD OF THE INVENTION

The invention relates generally to natural language processing, information extraction, information retrieval and to text mining and more particularly to determining relevancy of terms within documents. More specifically, the invention relates to statistical weighting of terms within a single document to determine how relevant or important the term is to that document and in particular to the content of that document.

BACKGROUND OF THE INVENTION

Much of the world's information or data is in the form of text and the majority of that is unstructured (without metadata) text. Much of this textual data is available in digital form (either originally created in this form or somehow converted to digital—by means of OCR (optical character recognition), for example). This text is being stored and made available via the Internet or other networks. All of these advances have made it possible to investigate, retrieve, extract and categorize information contained in vast repositories of documents, files, or other text "containers." This proliferation of documents available in electronic form and techniques resulted in a need for tools that facilitate wading through the ever-increasing expanse of documents. One such tool is information extraction software that, typically, involves applying a text analysis process to electronic documents written in a natural language and populating a database with information extracted from such documents. Applied against a given a textual document, the process of information extraction (IE) is used to identify entities of predefined types appearing within the text and listing them. IE may also be applied to extract other words or terms or strings of words or phrases.

"Term" refers to single words or strings of highly-related or linked words or noun phrases, e.g., "New York Stock Exchange," "free market," "President Bush" or "health program." "Term extraction," or term recognition or term mining, is a type of IE process used to identify or find and extract relevant terms from a given document that appear in, and therefore have some relevance, to the content of the document. Techniques employed in term extraction may include linguistic or grammar-based techniques, natural language or pattern recognition, tagging or structuring, data visualizing and predictive formula. For example, all names of companies mentioned in the text of a document can be identified, extracted and listed. Similarly, names of people, products, countries, organizations, geographic locations, etc., are additional examples of "entity" type terms that are identified and included on a list. This IE process may be referred to as "named entity extraction" or "named entity recognition." There are a variety of methods available for automatic named entity extraction, including linguistic or semantic processors to identify, based on known terms or applied syntax, likely noun phrases. Filtering may be applied to discern true entities from unlikely entities. The output of the IE process is a list of the entities of each type and may include pointers to all occurrences or locations of each entity in the text. The IE process does not rank the entities. Thus, suppose a document on the merger of AOL and Time Warner happens to also mention Sony. Applying IE to this document, all three companies (AOL, Time Warner and Sony) would be listed identically, even though Sony is clearly less "central" or "relevant" to this text. Often the terms are then compared against a collection of documents or "corpus" to determine relevancy of the term to the document.

These tools allow businesses to discover relevant information buried in massive volumes of text-based materials, e.g., documents, emails, letters, articles, and books, thereby making it possible for businesses or users of such tools to identify and group relevant information and to make knowledge-based decisions. Tools that extract information that may not otherwise be discernible benefit many entities. Such entities include media and other content based concerns, information technology delivery concerns, professional services and resource providers, searching concerns, and in particular by researchers, professionals, executives, marketing analysts, campaign strategists, and others involved with such concerns. For example, a news service can use intelligent agents to monitor feeds and to automatically perform IE functions on the processed information. Predefined search terms or schema may be applied on such information to rapidly identify and deliver new items or articles of interest that satisfy some search or other user-defined criteria.

Examples of Information Extraction software include OpenCalais from Thomson Reuters; AlchemyAPI; CRF++; LingPipe; TermExtractor; TermFinder; and TextRunner. IE may be a separate process or a component or part of a larger process or application, such as business intelligence software. For instance, IBM has a business intelligence solution, Intelligent Miner For Text, that includes an information extraction function which extracts terms from unstructured text. Additional features include clustering, summarization, and categorization. These features analyze, for example, data accessible online or stored in traditional files, relational databases, flat files, and data warehouses or marts. Functions may include statistical analysis and mining techniques such as factor analysis, linear regression, principal component analysis, univariate curve fitting, univariate statistics, bivariate statistics, and logistic regression.

One rudimentary method of determining relevancy within a single document is simple count score, i.e., the number of times a term appears in a document. This is of limited value. What is needed is a more sophisticated way to determine relevancy or importance of terms within a document based on the content of the document itself and to apply a more effective way to assign a degree of importance or relevancy of individual terms to the document.

Search engines retrieve documents in response to search terms. To this end, search engines may compare the frequency of terms that appear in one document against the frequency of those terms as they appear in other documents within the collection or corpus. This aids the search engine in determining respective "importance" of the different terms within the document, and thus determining the best matching documents to the given query. One method for comparing terms appearing in a document against a collection of documents is called Term Frequency-Inverse Document Frequency (TFIDF). In this method a percentage of term count as compared to all terms within a subject document is assigned (as a numerator) and that is divided by the logarithm of the percentage of documents in which that term appears in a corpus (as the denominator). More specifically, TFIDF assigns a weight as a statistical measure used to evaluate the importance of a word to a document in a collection of documents or corpus. The relative "importance" of the word increases proportionally to the number of times or "frequency" such word appears in the document. The importance is offset or compared against the frequency of that word appearing in documents comprising the corpus. TFIDF is expressed as the log (N/n(q)) where q is the query term, N is the number of documents in the collection and N(q) is the number of documents containing q. TFIDF and variations of this weighting scheme are typically used by search engines, such as Google, as a way to score and rank a document's relevance given a user query. Generally for each term included in a user query, the document may be ranked in relevance based on summing the scores associated with each term. The documents responsive to the user query may be ranked and presented to the user based on relevancy as well as other determining factors.

SUMMARY OF THE INVENTION

After traditional IE is performed on a document the output is simply a list of terms, e.g., entities, and perhaps locations, i.e., where terms appear in the document. IE can also identify more complex things in a document. ClearForest, a Thomson Reuters company that is one exemplary IE-based solution provider, offers text analytics software used to "tag," or categorize, unstructured information and to extract facts about people, organizations, places or other details from news articles, Web pages and other documents. ClearForest's Calais is a web service that includes the ability to extract entities such as company, person or industry term along with some basic facts and events. OpenCalais is an open source community to foster development around the Calais web service. APIs (Application Programming Interface) are provided around an open rule development platform to foster development of extraction modules. Other providers include Autonomy Corp., Nstein and Inxight.

The present invention analyzes the content of a single document and automatically assigns a relevance score to one or more entities appearing in the document. Unlike corpus-based relevance scores (e.g. TFIDF (see http://en.wikipedia.org/wiki/Tf-idf)) used by search engines for ranking the words and terms of a document, the inventive method is corpus independent. TFIDF and other collection-based methods are difficult to use on vague collections such as webpages and blogs. One problem associated with collection-based scoring is in choosing the correct background for comparing a specific document against the "collection." In these methods, how one defines the reference "collection" is critical and may be difficult. The invention can give a score within the subject "document", e.g., webpage or blog. The structure of the document is more critical to the invention to determine relevancy than comparing the document against a collection of documents as previously used. The invention, in contrast to TFIDF and other prior methods for associating relevancy of terms to a document, focuses on the document itself without comparing it against a collection or corpus. The inventive relevancy scoring techniques may be used to generate one or more intermediate relevancy score or scores which may then be supplemented using other techniques, such as TFIDF, corpus-based analysis or other techniques, to arrive at an aggregate relevancy score and/or ranking.

A rudimentary method of determining relevancy within a single document is simple count score, i.e., the number of times a term appears in a document. This is of limited value. What is needed is a more sophisticated way to determine relevancy or importance of terms within a document based on the content of the document itself and to apply a more effective way to assign a degree of importance or relevancy of individual terms to the document.

Traditional IE-based solutions do not assess relevance or "about-ness" of the document, i.e., what the document/article is about. The invention, for example after IE is performed, assesses the "about-ness" of the entities in the IE developed list to the document based on the document itself. In one manner, the inventive relevancy scoring process could be applied based on a manually prepared entity list. In general, the list may be generated by hand or delivered separately from external IE source, but still need document to accomplish scoring to determine how much the document is about the entity.

The invention provides post-IE scoring of relevancy of terms, where terms may include "entities", such as persons, companies, countries, organizations, movies (named things), things that "lists" may be compiled from. Concepts like "golf" could be a term that is the subject of the invention. Typically, terms are not subjects of what the document is about, e.g., politics, especially those not mentioned in the document. The invention is preferably applied to "things" over topics, but the invention could be used to score relevancy of terms that represent topics or non-entity subjects.

The invention is a method for scoring and ranking the entities identified by an IE process or otherwise by their "relevance" or "centrality" to the text at hand. One exemplary implementation of the invention is a method that assigns a score between 0 and 1 to each entity, where 1 denotes maximum relevancy and 0 minimal relevancy. The scores are assigned to each entity in each document, but are comparable across documents.

In a first embodiment the invention provides a computer implemented method comprising: receiving a list comprising an entity, the entity having been identified as being associated with an electronic document; based solely upon a set of characteristics of the document, determining a relevancy score associated with the entity with respect to the document; and storing the relevancy score. In addition, the set of characteristics may include at least one characteristic from the group consisting of: a first number representing a number of times the entity is mentioned in the document; a second number representing a number of sentences occurring in the document prior to a first sentence in which the entity is named; a third number representing a number of sentences between the first and last occurrences of the entity within the document; and a fourth number representing the uniformity with which the entity occurs within the document. Also, the list may comprise a second entity associated with the document and the method may include the steps of: based solely upon the set of characteristics, determining a second relevancy score associated with the second entity with respect to the document; storing the second relevancy score; and generating a ranking based upon a comparison of the first relevancy score and the second relevancy score. Also, the method may include the step of tagging the document based at least in part on the ranking of the assigned score. The set of characteristics may include at least one characteristic from the group consisting of: a first number representing a number of times the entity is mentioned in the document; a second number representing the proximity of the first occurrence of the entity to the beginning of the document; a third number representing the proximity of the first occurrence of the entity to the last occurrence of the entity within the document; and a fourth number representing the overall changes in the rate of occurrences of the entity throughout the document. The method may include the step of applying a Gaussian function to normalize the relevancy score and the step of determining whether the relevancy score meets a threshold prior to normalizing the relevancy score. Also, the list may be generated by performing information extraction. The step of determining may include using two or more relevancy algorithms to determine one or more of the following scores: occurrence count score; intro proximity score; first and last occurrence range score; and gap deviation score.

In a second embodiment, the invention provides a computer-implemented method comprising the steps of: receiving terms extracted from a first electronic document; scoring the extracted terms using two or more term relevancy algorithms based solely upon the first electronic document; aggregating for each of the extracted terms the scores generated by the two or more term relevancy algorithms to produce a term aggregate score for each of the extracted terms; and ranking each of the extracted terms based on the term aggregate score assigned to the extracted terms to determine a relevance ranking of the extracted terms to the first electronic document. The two or more relevancy algorithms may be from the group consisting of: determining a first number representing a number of times the term is mentioned in the document; determining a second number representing the proximity of the first occurrence of the term to the beginning of the document; determining a third number representing the proximity of the first occurrence of the term to the last occurrence of the term within the document; and determining a fourth number representing the overall changes in the rate of occurrences of the term throughout the document.

In yet a third embodiment, the invention provides an article comprising a machine-readable medium, the medium having stored thereon instructions to be executed by a machine to perform operations. The article comprises instructions for: receiving a list comprising a term, the term having been identified as being associated with an electronic document; based solely upon a set of characteristics of the document, determining and assigning a relevancy score to the term with respect to the document; and storing the relevancy score. The set of characteristics includes at least one characteristic from the group consisting of: a first number representing a number of times the term is mentioned in the document; a second number representing a number of sentences occurring in the document prior to a first sentence in which the term appears; a third number representing a number of sentences between the first and last occurrences of the term within the document; and a fourth number representing the uniformity with which the term occurs within the document. The list may comprise a second term associated with the document, the article further comprising instructions adapted to perform the following operations: based solely upon the set of characteristics, determining and assigning a second relevancy score associated with the second term with respect to the document; storing the second relevancy score; and generating a ranking based upon a comparison of the first relevancy score and the second relevancy score. The instructions for determining and assigning a relevancy score may comprise two or more relevancy algorithms that are used to determine one or more of the following scores: occurrence count score; intro proximity score; first and last occurrence range score; and gap deviation score.

In yet a fourth embodiment, the invention provides a computer-based system comprising memory and a processor for executing instructions to perform operations. The system comprises: an input adapted to receive a list comprising a term, the term having been identified as being associated with an electronic document; a relevancy scoring module adapted to determine a relevancy score associated with the term with respect to the document, the relevancy score being based solely upon a set of characteristics of the document; and a memory for storing the relevancy score. The list may comprise a second term associated with the document and the relevancy scoring module may be further adapted to determine a second relevancy score associated with the second term with respect to the document. The second relevancy score may be based solely upon the set of characteristics of the document and may be stored in memory. The relevancy scoring module may further comprise instructions for generating a ranking based upon a comparison of the first relevancy score and the second relevancy score. The relevancy scoring module may comprise instructions associated with two or more relevancy algorithms executed by the processor to determine one or more of the following scores: occurrence count score; intro proximity score; first and last occurrence range score; and gap deviation score.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
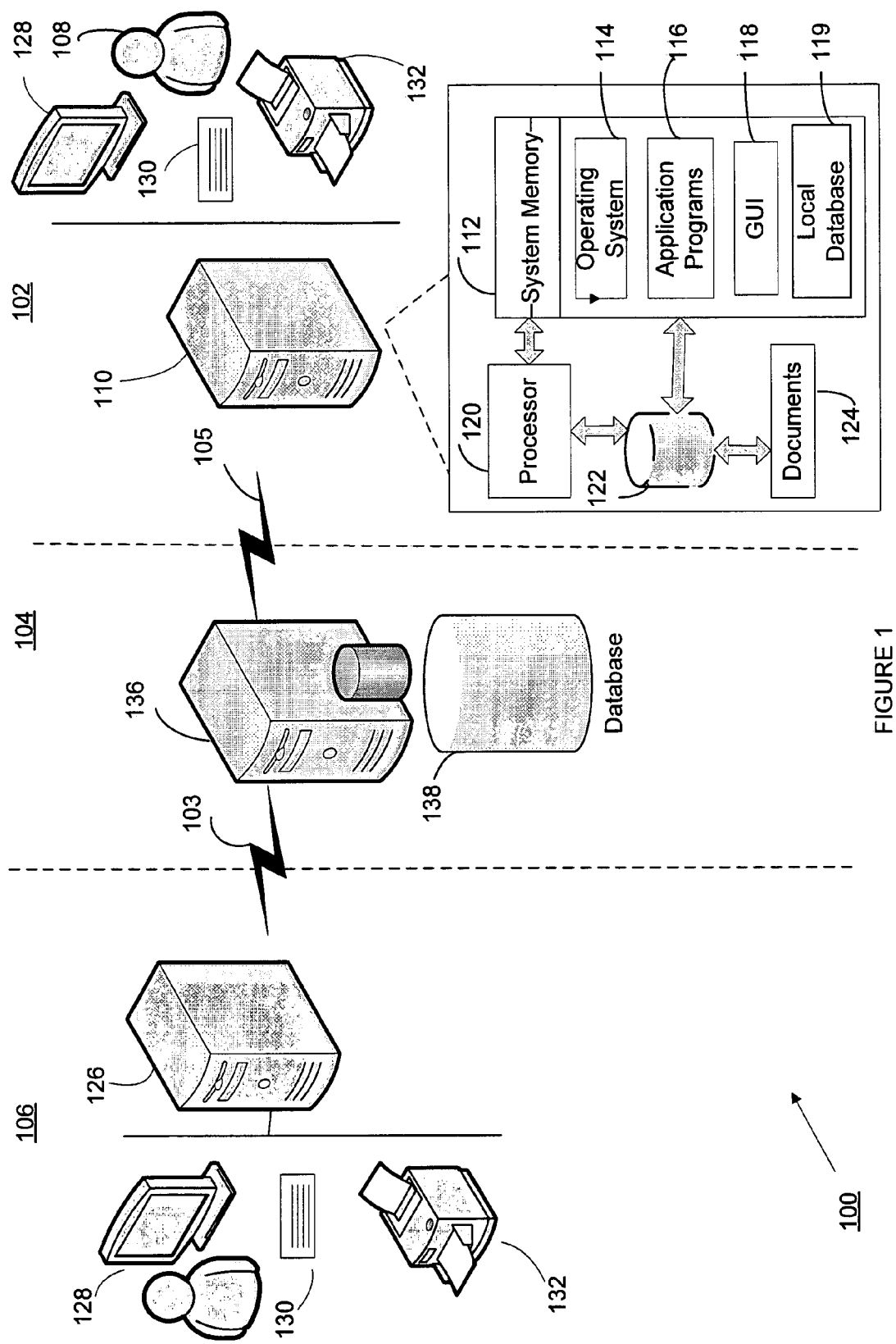
FIG. 1 is a schematic diagram illustrating an exemplary computer-based system for implementing the present invention.

With reference to FIG. 1, an exemplary embodiment of the present invention is illustrated in conjunction with a system for analyzing documents 100 that includes a local document processing system 102, an accessible document or knowledge database 104 and a remote document or search processing system 106. Aspects of the system 100 may be enabled using any combination of Internet or (World Wide) WEB-based, desktop-based, or application WEB-enabled. The local document processing system 102 includes a controller or processor 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents. The relevancy scoring techniques of the present invention, described in detail hereafter, are preferably in the form of software stored on machine-readable medium and comprising instructions executed, for example, by the processor 120 of computer 110. The instructions related to the relevance scoring techniques may be stored as an application program 116 in system memory 112. For purposes of this description, and not by way of limitation, we will refer to the relevancy scoring function as "Relevancy Scoring Module." The operating system 114 should be suitable for use with the Relevancy Scoring Module and browser functionality described herein, for example, Microsoft Windows Vista (business, enterprise and ultimate editions), or Windows XP Professional with SP2. Also, the Relevancy Scoring Module and associated software may include custom integration with Adobe Acrobat applications, scanning software, and Microsoft Office applications, e.g., Outlook, Word and Excel. Application programs 116 may include, for example, Adobe Acrobat, Microsoft Office 2007, Office XP, or Office 2003. The system may require the client machines to be compatible with minimum threshold levels of processing capabilities, e.g., Intel Pentium III, speed, e.g., 500 MHz, and other parameters.

System 102 may further comprise interface peripherals such as monitor 128, keyboard 130, and printer 132 and may be used to communicate remotely, such as via the Internet, with database server system 104. System 102 may include a network of computers, such as over a LAN, WLAN, Ethernet, token ring, FDDI ring or other communications network infrastructure. An operator or user 108 may establish communication link 105 with the database system 104. Separate document and searching system 106 may be configured in a similar fashion as system 102. The configuration described in this example is one of many and is not limiting as to the invention. Software to perform functions associated with system 100 may include self-contained applications within a desktop or server or network environment and may utilize local databases, such as SQL 2005 or above or SQL Express, IBM DB2 or other suitable database, to store documents, collections, and data associated with processing such information. Any of several suitable communication links are available, such as one or a combination of wireless, LAN, WLAN, ISDN, X.25, DSL, and ATM type networks, for example.

In one exemplary implementation, the inventive Relevancy Scoring Module is executed after traditional IE has been performed on a document resulting in a list of terms and perhaps locations, i.e., where terms appear in the document. After the list of terms has been generated, the Relevancy Scoring Module is applied against the document using the list of terms to assess the "about-ness" of the terms or entities in the list to the document from which the list came. The Relevancy Scoring Module scores and ranks the entities or terms on the list by their "relevance" or "centrality" to the text contained in the document. The Relevancy Scoring Module, in this exemplary manner, assigns a score between 0 and 1 to each entity, where 1 denotes maximum relevancy and 0 minimal relevancy. The scores are assigned to each entity in each document, but are comparable across documents. The scores can further be used to rank the entities as to their relevancy to the document. In addition, the scores can be used to obtain binary "yes"/"no" relevancy determination, by applying a threshold to the relevancy score.

Unlike other relevance scoring methods, such as TFIDF, that are corpus-based, the current method is corpus independent. TFIDF attempts to determine relevance based on identifying terms from a document and then making a comparison across many documents, the corpus or collection of references, and comparing how many times a term appears in the subject document with the number of occurrences in reference documents (corpus). In contrast, the Relevancy Scoring Module looks within the subject document to determine relevancy of the document to an entity or term, or vice-versa. The invention bases the score on the internal structure of the document at hand, as discussed in detail below, to provide a way to determine relevance when concerned with a single document or when the appropriate reference collection is not clearly defined (e.g., web pages). The structure of the document is more critical to the invention to determine relevancy than comparing the document against a collection of documents. The invention may be used independently from the IE process, for scoring entity lists provided by other means (e.g. manually created). The Relevancy Scoring Module may be used to generate one or more intermediate relevancy score or scores (see count, intro, range and gap deviation scores discussed below) which may then be supplemented using other techniques, such as TFIDF, corpus-based analysis or other techniques, to arrive at an aggregate relevancy score and/or ranking.

Figure 2:
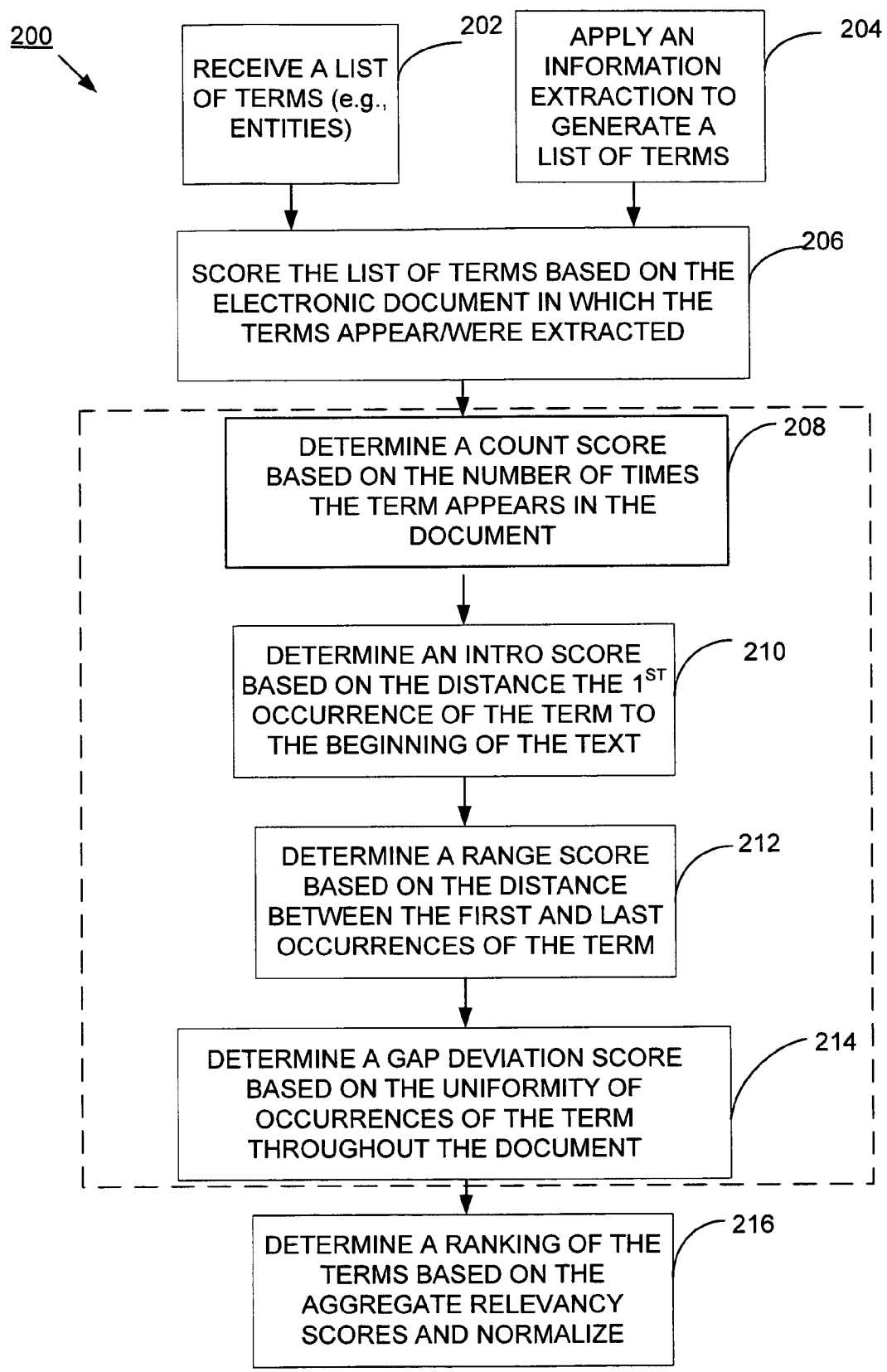
FIG. 2 is a is a flow chart illustrating an exemplary method of implementing the present invention.

FIG. 2 illustrates one preferred method, 200, of practicing the invention in analyzing a document containing terms to determine a relevancy scoring and/or ranking of the terms relative to the content of the document. A list of terms is received at 202, such as from a separately applied IE process or from manual examination of the document. In the alternative, the method may include an IE process, step 204, to extract the terms from the document as part of the overall process. For purposes of this example, the list of terms will be a list of entities. At step 206, and related steps 208-214, one or more algorithms are applied based on considering, for each entity on the list, the number of occurrences and locations where this entity is mentioned in the text. Based on this information, the Relevancy Scoring Module assigns four scores (each in the range [0,1]) for the entity, one for each of the following four measures used. The first measure or score, step 208, although in no particular order, is the "Count Score," which expresses the number of times the entity occurs within the document, which is then normalized (divided) by the overall number of entities' occurrences. Second, at step 210, is the "Intro Score," which expresses the distance or proximity of the first occurrence of this entity to the beginning of the text, and increases as this distance or proximity decreases, which is then normalized by a Gaussian such that an entity first occurring half-way through the document will be scored 0.5. Third, at step 212, is the "Range Score," which expresses the distance or proximity of the first occurrence to the last occurrence of this entity, and increases as this distance or proximity increases, which is then normalized by a Gaussian such that an entity which spreads over a quarter of the document sentences will be scored 0.5. And fourth, at step 214, is the "Gap Deviation Score," which assesses the overall changes in the rate of this entity's occurrences throughout the document. Roughly, this means that an entity occurring in the document at approximately fixed intervals (measured from one occurrence to the next) will be scored high. To measure this, the list of interval-lengths between each two consecutive occurrences is taken and those values' standard deviation, normalized by a Gaussian whose variance was determined empirically, is the gap deviation score. Each of these four scores are "relevancy" scores and may be "intermediate" scores that are further aggregated to arrive at an aggregate or total relevancy score and/or ranking. For instance, the four discrete intermediate relevancy scores may be aggregated and further processed to arrive at an aggregate relevancy score and may be further considered along with TFIDF and/or other techniques or considerations to arrive at yet a further aggregate or total relevancy score or rank.

At step 216, the aforementioned scores are then weighted and combined or aggregated into a single score. The list of terms may then be ranked based on relevancy. The aggregate score may be finally normalized such that the highest scoring entity will be given the score of 1. However, normalization is optional and may also be based on the aggregate score reaching a pre-defined threshold. In one manner, weighting may be accomplished by giving each score a constant multiplier between 0 and 1, e.g., count score by 0.5 intro by 0.1, range and gap scores by 0.2 then the scores are added to attain a composite score. It is not necessary that the highest score is normalized to a "1" rating. By not normalizing the high score to a score of "1", the process may be used to allow for relevance between documents. One optional bit of additional processing may include taking the collective, across all documents, score and then normalizing that score on a collective basis as opposed to normalizing on a per document level. In this manner the invention may be used to determine relevancy across a collection or corpus of documents.

More particularly, in one preferred embodiment, the relevancy scoring process is as set forth in the following Table 1 and then as exemplified in the examples of Tables 2-13. Table 1 sets forth in detail the preferred relevancy scoring process.

TABLE 1

The relevance score of entity e is defined as:

$S(e, d) = w_c C(e, d) + w_i I(e, d) + w_r R(e, d) + w_g G(e, d)$, where:

1. $C(e, d)$ is the Count Score of the entity in the document, defined as:

$$C(e, d) = \frac{count(e, d)}{\sum_{e'} count(e', d)} \text{ where}$$

count(e, d) is the number of times e occurs in document d.

2. $I(e, d)$ is the Intro Score of the entity in the document, defined as:

$$I(e, d) = \exp\left(-\frac{first(e, d)}{2\sigma_i^2}\right), \text{ where}$$

first(e, d) is the number (counted from the beginning) of the first sentence e occurs within.

$\sigma_i^2$ is a variance measure, with a default value of $\sigma_i^2 = -\frac{\#sentences(d)}{8 \ln(0.5)}$, where #sentences(d) is the total number of sentences in the document d.

3. $R(e, d)$ is the Range Score of the entity in the document, defined as:

$$R(e, d) = \exp\left(-\frac{1 - \frac{range(e, d)}{\#sentences(d)}}{2\sigma_r^2}\right), \text{ where}$$

range(e, d) is the total number of sentences in part of the document starting with the first occurrence of e in the document and ending in its last occurrence.

sentences(d) is the total number of sentences in d.

$\sigma_r^2$ is a variance measure, with a default value of $\sigma_r^2 = -\frac{0.25}{2 \ln(0.5)}$.

4. $G(e, d)$ is the Gap Deviation Score of the entity in the document, given by:

$$G(e, d) = \begin{cases} 0 & \text{if e occurs no more than two sentences;} \\ \exp\left(\frac{SD(diff(e, d))}{\sigma_g^2}\right) & \text{otherwise.} \end{cases}$$

where:

diff(e, d) is the sequence of distances (measured in number of sentences) between each two consecutive sentences in which e appears in the document. For example, if e appears in sentences 2, 5, 6, 9 and 13, then diff(e, d) = (3, 1, 3, 4).

SD is the ordinary standard deviation measure.

$\sigma_g^2$ is a variance measure, with a default value of $\sigma_g^2 = 50$.

5. $w_c, w_i, w_r, w_g$ are weights such that $w_c + w_i + w_r + w_g = 1$, with default values: $w_c = 2/7, w_i = 2/7, w_r = 2/7, w_g = 1/7$.

Tables 2 and 3, below, illustrate a first example, "Example 1", for a document entitled "GM's New Chair Is Rebuilder." The process as detailed in Table 1 is applied against the document of Table 2 to generate relevancy scores for the terms separately generated and as listed below.

TABLE 2

Example 1

GM's New Chair Is Rebuilder

CHICAGO (Reuters) - Two years after riding off into the sunset, former AT&T Inc Chairman and Chief Executive Ed Whitacre finds himself back in the saddle again.
As the new chairman of General Motors Corp, the 67-year-old, straight-talking Texan faces the unenviable task of overseeing the rebuilding of what is perhaps the country's biggest and best-known corporate basket-case.
And he'll have to do it with the U.S. government, which now owns a majority of the bankrupt carmaker, scrutinizing his every move.

TABLE 2-continued

Example 1

Putting something back together? With the government second-guessing his every move?
Whitacre is back in his element.
He cobbled together the company now known as AT&T by taking a collection of disparate
regional telephone companies created by the breakup of "Ma Bell" in the 1980s - and
reassembling them through a series of seven high-profile, and sometimes risky, acquisitions.
In the process, Whitacre built the company into the biggest U.S. telecommunications service
provider.
"Who said retired CEOs are forgotten about?" said Jeff Kagan, a telecom analyst who has
watched Whitacre for the past two decades.
"Ed does not know the automobile business, but he has (the) unique ability to understand a
business as it transforms itself. He was a big success in the changing telecom space. Perhaps,
he can be just as successful in the transforming automobile space."
AT&T EXPERIENCE Whitacre headed AT&T from 1990 to 2007. In 1993, he moved the headquarters of what was
then known as Southwestern Bell Corp from St. Louis to San Antonio, Texas. He continues to live
there today and serves as an adjunct business professor at Texas Lutheran College in nearby
Seguin.
"I am just tickled that they've selected him," said Richard Perez, who worked closely with
Whitacre as a member of the San Antonio City Council and then as president of the Greater San
Antonio Chamber of Commerce, where Whitacre served on the board of directors.
"He has a vision for bringing things together and making them work, and growing them, and that's
what GM needs right now. It was floating too long on the sea of not knowing what the hell they
were doing . . . I think he is going to refocus the mission of the organization and turn it back into its
glory days."
Whitacre will become chairman of the restructured automaker later this summer.
The No. 1 U.S. automaker, which filed for bankruptcy on June 1, plans to undertake a quick sale
process that would allow a much smaller company to emerge from court protection in as little as
60 to 90 days.
The automaker's current interim chairman, Kent Kresa, will continue to serve in that position until
then.
Kresa, former chief executive of Northrop Grumman Corp, became GM chairman in March when
the Obama administration ousted Rick Wagoner, who had held both the chairman and chief
executive officer positions.
Whitacre and Kresa, along with current board members Philip Laskawy, Kathryn Marinello, Erroll
Davis Jr, E. Neville Isdell and current GM CEO Fritz Henderson, will serve as the "nucleus" of the
restructured company's board, GM said in a statement.
The six other members of the current board will most likely retire, according to the automaker.
GM has retained executive search firm Spencer Stuart to find directors to serve on the board of
the new company.
(end of document)

In this example, an IE process, separate from the process of Table 1, may be applied to determine a list of entities contained in the document of Example 1. How the list is generated is not critical to the invention. For instance, the list may be generated manually or automatically using IE techniques well known and discussed above. In any event, the following list of entities, grouped by entity type (company, country, organization, and people) is associated with the document of Example 1:

Companies: General Motors Corp, AT&T Inc, Northrop Grumman Corp, Southwestern Bell Corp, Spencer Stuart;

Countries: United States;

Organizations: U.S. government, San Antonio City Council, Greater San Antonio Chamber of Commerce, Texas Lutheran College; and People: Ed Whitacre, Kent Kresa, Rick Wagoner, Jeff Kagan, Fritz Henderson, Erroll Davis Jr, Kathryn Marinello, Richard Perez, Philip Laskawy, E. Neville Isdell.

Using this list of entities, the process of Table 1 is applied against the document of Example 1, which yields the Relevancy Scores as set forth in Table 3, below. In this example, the entities are sorted by relevancy score.

TABLE 3

Example 1 Relevancy Ranks/Scores

| Entity | Type | Relevancy Rank/Score (min 0, max 1) |
| --- | --- | --- |
| Ed Whitacre | person | 0.791 |
| General Motors Corp | Company | 0.723 |
| United States | country | 0.647 |
| AT&T Inc | Company | 0.614 |
| Southwestern Bell Corp | Company | 0.614 |
| U.S. government | Organization | 0.315 |
| Jeff Kagan | Person | 0.251 |
| Kent Kresa | Person | 0.229 |
| Texas Lutheran College | Organization | 0.137 |
| San Antonio City Council | Organization | 0.122 |
| Greater San Antonio Chamber of Commerce | Organization | 0.122 |
| Richard Perez | Person | 0.122 |
| Northrop Grumman Corporation | Company | 0.060 |
| Rick Wagoner | Person | 0.060 |
| Fritz Henderson | Person | 0.053 |
| Erroll Davis Jr | Person | 0.053 |
| Kathryn Marinello | Person | 0.053 |
| Philip Laskawy | Person | 0.053 |
| E. Neville Isdell | Person | 0.053 |
| Spencer Stuart Inc | Company | 0.051 |

With reference to the relevancy ranks of Table 3, applying the process of Table 1 against the document of Example 1 yields a "relevancy score" for each of the entities listed above. The relevancy score is a number between 0 and 1, with the score closest to 1 signifying a term or entity that is the most relevant to the content of the document. Another way of looking at this is, the bigger the score, the more the document is "about" that term or entity. For example, in the document of Example 1, ten different people are mentioned in the document. However, Ed Whitacre achieves a relevancy score of 0.791 and the remaining nine receive a relevancy score of below 0.26. Accordingly, in accordance with the relevancy scoring process of the present invention, the article of Example 1 is clearly more about Ed Whitacre than any of the other persons mentioned in the article and a reading confirms as much. Accordingly, Of the other types of entities, General Motors is the highest ranked company (0.723), United States is the highest ranked country (0.647), and the U.S. Government is the highest ranking organization (0.315).

Tables 4 and 5, below, illustrate a second example, "Example 2", for a document entitled "Porsche Enlists Qatar's Help With Volkswagen Deal." The process as detailed in Table 1 is applied against the document of Table 4 to result in relevancy ranks as set forth in Table 5 for each of the entities identified in the list below.

In this example, the process of Table 1 is applied against the following list of entities:

Companies: Porsche, Volkswagen, Qatar Investment Authority, Porsche Holding, Piech, BHF Bank, Daimler, The Financial Times;
Countries: Qatar, Germany, Austria, Kuwait;
Organizations: Qatari government; and
People: Aleksej Wunrau.

Applying this list to the process of Table 1 yields the "Relevancy Scores" set forth in Table 5. In this example, the entities are sorted by relevancy score.

TABLE 5

Example 2 Relevancy Scores

| Entity | Type | Relevancy Score (min 0, max 1) |
|---|---|---|
| Porsche | Company | 0.765 |
| Volkswagen | Company | 0.700 |
| Qatar Investment Authority | Company | 0.556 |
| Germany | Country | 0.312 |

TABLE 4

Example 2

Porsche Enlists Qatar's Help With Volkswagen Deal

HAMBURG, Germany (Reuters) - Porsche SE (PSHG_p.DE) is in exclusive talks to sell a stake to the Gulf state of Qatar, in a deal that could cut the German automotive holding's debt and strengthen its position for a merger with Volkswagen.
The move could pave the way for the Porsche and Piech families to give up full control over their business and is further evidence of the increasing role of Arab states in an auto industry founded by the German Carl Benz, when he invented the modern gasoline-powered car in 1885.
Should Qatar buy a stake, the proceeds could help repair Porsche SE's tattered balance sheet and bolster its bargaining position when arguing for a merger of equals with financially solid Volkswagen.
"There are only talks with Qatar now," a Porsche spokesman said.
A person close to Porsche said that the company was in talks with investment fund Qatar Investment Authority (QIA) to sell a stake in its automobile holding via a capital increase of unlisted common shares or by divesting its options for Volkswagen shares (VOWG.DE).
QIA and the Qatari government have declined comment.
Porsche shares eased 0.9 percent to 46.57 euros by 1310 GMT (9:10 a.m. EDT) while Volkswagen shares rose 1.6 percent to 251.80 euros.
FAMILY DEALERSHIP So far, investors could only buy exposure to Porsche's iconic sports car brand through the purchase of preferred shares that gave them no say in the company, which has a majority voting stake in Volkswagen.
Building up the VW stake saddled Porsche with 9 billion euros of net debt.
The two controlling families also own Salzburg-based Porsche Holding, Europe's largest dealership group that owns the lucrative distribution rights to sell VW group cars in Austria and Eastern Europe.
BHF Bank analyst Aleksej Wunrau suggested on Tuesday that the families may want to consider including Porsche Holding in a merger with Porsche SE and Volkswagen, where VW ordinary stock would reflect his estimated fair value of 80 euros per share."
"Lower Saxony would fail to achieve a blocking minority, Porsche would economise on costs tied to a further rolling-over of its forward contracts in VW, and legal issues with VW's preferred shareholders who might appeal to the enormous spread between the commons and the preferred shares in the appraisal would be evaded," he wrote in a research note.
Thanks to VW statutes and a federal law that protects its influence, Lower Saxony can veto key decisions even though it owns just 20 percent of the company's common shares.
The Financial Times had reported that QIA could take a stake of up to 25 percent in Porsche's holding company in a deal involving a capital increase of up to 4.5 billion euros ($6.25 billion).
A deal could be announced within weeks, the paper had said.
In March, Abu Dhabi's IPIC sovereign wealth fund bought a 9.1 percent stake in Daimler (DAIGn.DE) for almost 2 billion euros via its exchange-listed vehicle Aabar AABAR.AD, making it the largest shareholder ahead of fellow Gulf state Kuwait.
(end of document).

TABLE 5-continued

Example 2 Relevancy Scores

| Entity | Type | Relevancy Score (min 0, max 1) |
|---|---|---|
| Piech | Company | 0.303 |
| Qatari government | Organization | 0.228 |
| Porsche Holding | Company | 0.145 |
| Aleksej Wunrau | Person | 0.129 |
| Austria | Country | 0.126 |
| BHF Bank | Company | 0.107 |
| The Financial Times | Company | 0.064 |
| Daimler | Company | 0.054 |
| Kuwait | Country | 0.054 |
| Abu Dhabi | City | 0.054 |

With reference to the relevancy ranks of Table 5, applying the process of Table 1 against the document of Example 2 yields a "relevancy score" for each of the entities listed above. As with Example 1, the relevancy score is a number between 0 and 1, with the score closest to 1 signifying a term or entity that is the most relevant to the content of the document. In the document of Example 2, nine different companies are scored in the document. Porsche (0.765) is the highest ranking company and the next in line is Volkswagon (0.700). Accordingly, in accordance with the relevancy scoring process of the present invention, the article of Example 2 is clearly more about companies than it is about people mentioned in the article and a reading confirms as much. Of the other types of entities, Germany is the highest ranked country (0.312), Qatari government is the highest ranked organization (0.228), and Aleksej Wunrau is the highest ranking person (0.129). In addition, where entities are associated in some manner to form a collective entity, e.g., "car companies" could be combined to form an even higher ranked combined or collective entity. This may be particularly beneficial in taxonomies that focus on corporations having multiple entities, e.g., subsidiaries, etc., or families with multiple persons of interest, e.g., Bush family associated with former presidents and others.

Tables 6 and 7, below, illustrate a third example, "Example 3", for a document entitled "Investcorp Eyes Regional Luxury Firms." The process as detailed in Table 1 is applied against the document of Table 6 to result in relevancy ranks as set forth in Table 7 for each of the entities identified in the list below.

TABLE 6

Example 3

Investcorp Eyes Regional Luxury Firms

DUBAI (Reuters) - Bahrain's Investcorp INVB.BH (INVBq.L: Quote, Profile, Research, Stock Buzz) said on Tuesday it planned to buy stakes in homegrown Middle Eastern luxury goods companies as part of a wider plan to invest $650 million in the region in the next two years. Investcorp, previously an investor in high-end brands Gucci (GUCG.PK: Quote, Profile, Research, Stock Buzz) and Tiffany (TIF.N: Quote, Profile, Research, Stock Buzz), is in talks with families and businesses in the Gulf, North Africa and Turkey, said Azmat Taufique, co-head of the bank's Gulf Growth Capital business.
New investments under its $1 billion Gulf Opportunity Fund would strive to mirror a 70 percent acquisition last year of the Middle East's largest gold and jewelry maker, L'Azurde, which Investcorp made along with partners, Taufique said.
"We are looking at other businesses in the region with similar dynamics, not necessarily jewelry but broadly in mass luxury," Taufique told the Reuters Global Luxury Summit, adding he estimated the mass luxury market would grow about 10 percent a year in the region.
"We want to build brands that will resonate. The market is evolving, the region is growing up, and our business people and entrepreneurs have built brands," he said in Dubai.
L'Azurde was a strong investment because its products appeal to a wide section of the population, cater to a demographic of 16-40 year olds, are regarded as fashionable and play on a Middle Eastern cultural affinity for owning gold, Taufique said.
Bahrain-based Investcorp was in talks for acquisitions of companies with similar strategic characteristics in the broader mass luxury field, where some companies are seeking alternative funding sources, he said.
About a quarter of the eight to 10 acquisitions Investcorp intends to complete in the region in the next two years will be in the luxury goods segment, Taufique said.
The private equity firm is also exploring investments in European or Asian companies whose brands it could move to the Middle East, he added.
The Middle East has about 5 percent market share of the $300 billion global luxury business, Taufique said.
SEEKING LUXURY During the credit crunch that started late last year and has been felt across the region, some businesses have found difficulties securing loans from banks to finance new outlets and expansion plans.
In markets like Dubai, where the economy is suffering from a real estate sector crash and downturn in tourist visits, retailers have been pinched by lower sales this year.
But Taufique said luxury goods companies in the United Arab Emirates and markets like Saudi Arabia and Egypt, which boast large indigenous populations, exhibit strong medium-term growth prospects - making them prime candidates for the fund.
"There are many companies, businesses not just in luxury that we are targeting.
"We are in the fortunate situation that we have a fairly strong dry powder base that we can invest into these businesses."
Saudi Arabia, the largest Arab economy, and Egypt are home to about 100 million people, compared with about 4.5 million in the UAE, known as a strong tourist and shopping destination.
Investcorp - which also runs business lines including private equity in North America and technology in the West - started its Gulf Opportunity Fund about three years ago to target growth in the world's biggest oil-exporting region.
(end of document)

In this example, the process of Table 1 is applied using the following list of entities:

Companies: Investcorp, L'Azurde, Gulf Growth Capital, Reuters;
Countries: Egypt, Saudi Arabia, Bahrain, Turkey, UAE, United Arab Emirates;
Organizations: Gulf Opportunity Fund; and
People: Azmat Taufique.

The process of Table 1 applied against this list yields the "Relevancy Scores" set forth in Table 7. In this example, the entities are sorted by relevancy score.

TABLE 7

Example 3 Relevancy Scores

| Entity | Type | Relevancy Score (min 0, max 1) |
|---|---|---|
| Investcorp | Company | 0.753 |
| Azmat Taufique | Person | 0.699 |
| Gulf Opportunity Fund | Organization | 0.677 |
| Bahrain | Country | 0.425 |
| L'Azurde | Company | 0.344 |
| Gulf Growth Capital | Company | 0.305 |
| Turkey | Country | 0.305 |
| Reuters | Company | 0.275 |
| Egypt | Country | 0.110 |
| Saudi Arabia | Country | 0.110 |
| United Arab Emirates | Country | 0.086 |
| UAE | Country | 0.063 |

With reference to the relevancy ranks of Table 7, applying the process of Table 1 against the document of Example 3 yields a "relevancy score" for each of the entities listed above. As with Example 1, the relevancy score is a number between 0 and 1, with the score closest to 1 signifying a term or entity that is the most relevant to the content of the document. In the document of Example 3, four different companies, six different countries and one person and organization are scored in the document. Investcorp (0.753) is the highest ranking company, and the highest ranked entity, however, Azmat Taufique (person—0.699) and Gulf Opportunity Fund (organization—0.677) also received a relatively high score. The highest ranked country is Bahrain with a score of 0.425. Other techniques may then be applied to classify the document further. For example, in this case the term "gulf" appears and the countries mentioned are in the Middle East.

Tables 8 and 9, below, illustrate a fourth example, "Example 4", for a document entitled "Microsoft, Adobe Warn Of Critical Security Flaws." The process as detailed in Table 1 is applied against the document of Table 8 to result in relevancy scores as set forth in Table 9 for each of the entities identified in the list below.

TABLE 8

Example 4
Microsoft, Adobe Warn Of Critical Security Flaws

BOSTON (Reuters) - Microsoft Corp issued software to fix a record 31 security flaws in its programs, and Adobe Systems Inc warned that glitches in its products could let hackers take control of a user's PC.
Microsoft released patches on Tuesday that repair vulnerabilities in Windows, Office and Internet Explorer, as well as key pieces of software that businesses use in their data centers.
Adobe said in a security bulletin on its website that Reader and Acrobat users should update their software to the newest versions. Additional software is available if those releases are not compatible with a customer's PC.
The maker of design and document imaging software said it has yet to find any malicious software that exploits the vulnerabilities. It classified the risk as "critical," the highest level of risk on its scale evaluating the danger of such threats.
Adobe said the threat applies to users of Windows PCs as well as Apple Inc's Macintosh computers.
Once hackers learn of security vulnerabilities, they quickly develop malicious software to exploit them. Such programs can be used for cybercrimes such as identity theft, sending spam and taking control of computer systems.
Alerting hackers to the flaws presents a challenge for businesses as they need time to test the patches before installing them on their computer systems. They need to make sure that the new software does not interfere with existing programs because patches can sometimes cause systems to crash.
"Patching will be especially challenging for enterprises," Dave Marcus, a senior researcher with McAfee Inc, the world's No. 2 security software maker, said of the Microsoft patches.
It will be easier for consumers to address the threats as they can quickly download patches over the Internet, easily eliminating their exposure to attack. Such patches rarely cause stand-alone PCs to crash. (end of document)

In this example, the process of Table 1 is applied against the following list of entities:

Companies: Microsoft Corp, Adobe, Apple Inc, McAfee Inc, Adobe Systems Inc;
People: Dave Marcus.

The process of Table 1 applied against this list yields the "Relevancy Scores" set forth in Table 9. In this example, the entities are sorted by relevancy score.

TABLE 9

Example 4 Relevancy Scores

| Entity | Type | Relevancy Score (min 0, max 1) |
|---|---|---|
| Microsoft Corp | Company | 0.755 |
| Adobe | Company | 0.714 |
| Adobe Systems Inc | Company | 0.714 |
| Apple Inc | Company | 0.142 |
| Dave Marcus | Person | 0.080 |
| McAfee Inc | Company | 0.080 |

With reference to the relevancy ranks of Table 9, applying the process of Table 1 against the document of Example 4 yields a "relevancy score" for each of the entities listed above. As with Example 1, the relevancy score is a number between 0 and 1, with the score closest to 1 signifying a term or entity that is the most relevant to the content of the document. In the document of Example 4, five different companies are scored in the document with three of them scoring high relevancy and two receiving low relevancy scores. Microsoft (0.755) is the highest ranking company, and the highest ranked entity, with Adobe and Adobe Systems Inc. receiving scores of 0.714. Apple received a much lower score of 0.142 and McAfee Inc received a score of 0.080. The only other entity scored, Dave Marcus as a person, received a score of 0.080. Other techniques may then be applied to classify the document further. For example, in this case the companies are all software companies.

Tables 10 and 11, below, illustrate a fifth example, "Example 5", for a document entitled "'Futurama' Has New Future On Comedy Central." The process as detailed in Table 1 is applied against the document of Table 10 to result in relevancy ranks as set forth in Table 11 for each of the entities identified in the list below.

TABLE 10

Example 5
"Futurama" Has New Future On Comedy Central

LOS ANGELES (Hollywood Reporter) - It's back to "Futurama" for fans of the animated series.
Taking a page from the "Family Guy" resurrection guidebook, the canceled Fox animated comedy
is returning with an order from Comedy Central for 26 new episodes to run over two seasons.
"Futurama" creators Matt Groening and David X. Cohen already are working on stories for the
new batch of episodes of the sci-fi cartoon, slated to premiere on Comedy Central in mid-2010.
Just as with "Family Guy," whose improbable return was triggered by big DVD sales and solid
ratings for the show's reruns on Cartoon Network, the performance of "Futurama's" repeats on
Comedy Central and on DVD was key to its resurrection.
The 26-episode order from Comedy Central was preceded by four feature-length original
"Futurama" specials: "Bender's Big Score," "The Beast With a Billion Backs," "Bender's Game"
and "Into the Wild Green Yonder," which have done well on DVD and on Comedy Central. (The
most recent special, "Yonder," premieres on Comedy Central in September.)
Comedy Central was happy with the specials and with the 72 produced episodes of "Futurama" it
acquired from 20th Century Fox TV in 2006.
"Yet there is nothing like new, self-contained episodes week to week," said Comedy Central's
senior vice president programming David Bernath. "This is all about reinvigorating the franchise,
giving it a new burst of energy."
"Futurama," which aired on Fox for five seasons (from 1999 to 2003) centers on Philip Fry (Billy
West), a 25-year-old pizza delivery boy who accidentally freezes himself on Dec. 31, 1999,
and wakes up 1,000 years later with a fresh start at life and a "diverse" new group of friends
including Leela (Katey Sagal), a tough but lovely one-eyed alien, and Bender (John DiMaggio), a
robot who possesses human characteristics and flaws.
When the series returns with original episodes in 2010, it will be seven years after the show's last
original episode aired on Fox. That's a much longer hiatus than the three years "Family Guy"
spent on the bench before being summoned back by Fox.
The four "Futurama" specials, produced in the past two and a half years, helped bridged the gap,
said Groening, who also created the Fox/20th TV long-running animated comedy "The
Simpsons."
"It was a great way of keeping the show alive, and one of the great things was that everyone
enjoyed doing them, so it's been relatively easy trying to get everyone who was originally on the
show to come back," he said.
All key voice cast members are expected to return for the new original episodes of "Futurama,"
along with the series' core writing team.
Storyline-wise, the new episodes will pick up where the most recent DVD special, "Yonder," took
off - with the main characters fleeing death and flying into the unknown.
But after four epic-in-scope feature-length films, "what we will try to do is go a little bit back to
pure comedy, characters and sci-fi," Cohen said.
(end of document)

In this example, the process of Table 1 is applied to the following list of entities:
People: Matt Groening, David X. Cohen, David Bernath, John DiMaggio, Billy West, Katey Sagal.

In this case there is only one entity type—people. The process of Table 1 applied against this list yields the "Relevancy Scores" set forth in Table 11. In this example, the entities are sorted by relevancy score.

TABLE 11

Example 5 Relevancy Score

| Entity | Type | Relevancy Score (min 0, max 1) |
|---|---|---|
| Matt Groening | Person | 0.619 |
| David X. Cohen | Person | 0.529 |
| David Bernath | Person | 0.191 |
| John DiMaggio | Person | 0.140 |
| Billy West | Person | 0.140 |
| Katey Sagal | Person | 0.140 |

With reference to the relevancy ranks of Table 11, applying the process of Table 1 against the document of Example 5 yields a "relevancy score" for each of the entities listed above.

As with Example 1, the relevancy score is a number between 0 and 1, with the score closest to 1 signifying a term or entity that is the most relevant to the content of the document. In the document of Example 5, six different "people" type entities are scored in the document with two of them scoring high relevancy and the remaining four receiving relatively low relevancy scores. Matt Groenig (0.619) is the highest ranking entity with David X. Cohen receiving the next highest score of 0.529. The remaining entities received scores of less than 0.20.

Tables 12 and 13, below, illustrate a sixth example, "Example 6", for a document entitled "CEO Forgot To Tell Wife About Pay Cut." The process as detailed in Table 1 is applied against the document of Table 12 to result in relevancy scores as set forth in Table 13 for each of the entities identified in the list below.

TABLE 12

Example 6
CEO Forgot To Tell Wife About Pay Cut

KUALA LUMPUR (Reuters) - British Airways Plc Chief Executive Willie Walsh is showing solidarity with his staff in planning to work without pay next month as part of cost cuts, but the move may not have gone down so well with his wife.
"She read about it in the papers," a grinning Walsh told Reuters at a lunch for airline executives gathering in the Malaysian capital.
Walsh, whose normal salary is 735,000 pounds ($1.2 million) a year, will work for nothing in July as part of a cost-cutting drive under which 2,500 staff have left the airline in the past year. The airline unveiled record losses last month.
Many airlines have cut jobs as the industry has been battered by a global downturn that has hit demand for travel and air freight.
(end of document)

In this example, the process of Table 1 is applied against the following list of entities:
Companies: British Airways Plc, Reuters;
People: Willie Walsh.
The process of Table 1 applied to this list yields the "Relevancy Scores" set forth in Table 13. In this example, the entities are sorted by relevancy score.

TABLE 13

Example 6 Relevancy Score

| Entity | Type | Relevancy Score (min 0, max 1) |
|---|---|---|
| Willie Walsh | Person | 0.691 |
| British Airways Plc | Company | 0.466 |
| Reuters | Company | 0.245 |

With reference to the relevancy ranks of Table 13, applying the process of Table 1 against the document of Example 6 yields a "relevancy score" for each of the entities listed above. As with Example 1, the relevancy score is a number between 0 and 1 with the score closest to 1 signifying a term or entity that is the most relevant to the content of the document. In the document of Example 6, two companies and one person type entities are scored with the person, Willie Walsh, scoring the highest relevancy score (0.691). British Airways Plc and Reuters receive relevancy scores of 0.466 and 0.245, respectively.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer implemented method comprising:
receiving a list comprising an entity, the entity having been identified as being associated with an electronic document;
based solely upon a set of characteristics of the document, determining a relevancy score associated with the entity with respect to the document, wherein the set of characteristics includes at least one characteristic from the group consisting of:
a first number representing a number of sentences occurring in the document prior to a first sentence in which the entity is named;
a second number representing a number of sentences between first and last occurrences of the entity within the document; and
a third number representing a uniformity with which the entity occurs within the document; and
storing the relevancy score.

2. The method of claim 1, wherein the list comprises a second entity associated with the document, the method further comprising:
based solely upon the set of characteristics, determining a second relevancy score associated with the second entity with respect to the document;
storing the second relevancy score; and
generating a ranking based at least in part upon the first relevancy score and the second relevancy score.

3. The method of claim 2 further comprising: tagging the document based at least in part on the ranking of the assigned score.

4. The method of claim 1, wherein the set of characteristics includes at least one characteristic from the group consisting of:
a first number representing a proximity of a first occurrence of the entity to the beginning of the document;
a second number representing a proximity of a first occurrence of the entity to the last occurrence of the entity within the document; and
a third number representing overall changes in a rate of occurrences of the entity throughout the document.

5. The method of claim 1 further comprising: applying a Gaussian function to normalize the relevancy score.

6. The method of claim 5 further comprising determining whether the relevancy score meets a threshold prior to normalizing the relevancy score.

7. The method of claim 1, wherein the document is unstructured.

8. The method of claim 1 further comprising: performing information extraction to generate the list.

9. The method of claim 1 wherein the step of determining includes using two or more relevancy algorithms to determine one or more of the following relevancy scores: occurrence count score; intro proximity score; first and last occurrence range score; and gap deviation score.

10. The method of claim 1, wherein the set of characteristics includes a number representing a number of times the entity is mentioned in the document.

11. The method of claim 1 further comprising determining a combined relevancy score associated with the entity based on the relevancy score and at least one additional factor.

12. The method of claim 11, wherein the at least one additional factor comprises TFIDF.

13. The method of claim 1 further comprising determining a plurality of relevancy scores for a plurality of entities; determining a ranking of the plurality of entities based at least in part on the plurality of relevancy scores and at least one additional factor.

14. The method of claim 13, wherein the at least one additional factor comprises TFIDF.

15. A computer-implemented method comprising:
receiving terms extracted from a first electronic document;
scoring the extracted terms using two or more term relevancy algorithms based solely upon the first electronic document, wherein the two or more relevancy algorithms are from the group consisting of:
  determining a first number representing a number of times the term is mentioned in the document;
  determining a second number representing a proximity of a first occurrence of the term to the beginning of the document;
  determining a third number representing a proximity of a first occurrence of the term to a last occurrence of the term within the document; and
  determining a fourth number representing overall changes in a rate of occurrences of the term throughout the document;
aggregating for each of the extracted terms the relevancy scores generated by the two or more term relevancy algorithms to produce a term aggregate relevancy score for each of the extracted terms; and
ranking each of the extracted terms based on the term aggregate relevancy score assigned to the extracted terms to determine a relevance ranking of the extracted terms to the first electronic document.

16. The method of claim 15, wherein the two or more relevancy algorithms are used to determine one or more of the following relevancy scores: occurrence count score; intro proximity score; first and last occurrence range score; and gap deviation score.

17. The method of claim 15, wherein the ranking to determine a relevance ranking comprises normalizing at least one term aggregate relevancy score by a Gaussian function.

18. The method of claim 15 further comprising determining whether the term aggregate relevancy score meets a threshold and, if the threshold is met, normalizing the term aggregate relevancy score.

19. The method of claim 15, wherein each of the received extracted terms represents an entity.

20. The method of claim 15 further comprising: tagging the first electronic document based at least in part on the ranking of the extracted terms.

21. The method of claim 15, wherein the first electronic document is unstructured.

22. The method of claim 15 further comprising: performing information extraction to generate the extracted terms.

23. The method of claim 15 further comprising determining a combined relevancy score associated with the entity based on the term aggregate relevancy score and at least one additional factor.

24. The method of claim 23, wherein the at least one additional factor comprises TFIDF.

25. The method of claim 15 further comprising determining a plurality of term aggregate relevancy scores for a plurality of entities; determining a ranking of the plurality of entities based at least in part on the plurality of term aggregate relevancy scores and at least one additional factor.

26. The method of claim 25, wherein the at least one additional factor comprises TFIDF.

27. An article comprising a non-transitory machine-readable medium, the medium having stored thereon instructions to be executed by a machine to perform operations, the article comprising instructions for:
receiving a list comprising a term, the term having been identified as being associated with an electronic document;
based solely upon a set of characteristics of the document, determining and assigning a relevancy score to the term with respect to the document, wherein the set of characteristics includes at least one characteristic from the group consisting of:
  a first number representing a number of sentences occurring in the document prior to a first sentence in which the term appears;
  a second number representing a number of sentences between first and last occurrences of the term within the document; and
  a third number representing a uniformity with which the term occurs within the document; and
storing the relevancy score.

28. The article of claim 27, wherein the list comprises a second term associated with the document, the article further comprising instructions adapted to perform the following operations:
based solely upon the set of characteristics, determining and assigning a second relevancy score associated with the second term with respect to the document;
storing the second relevancy score; and
generating a ranking based at least in part upon a comparison of the first relevancy score and the second relevancy score.

29. The article of claim 27, wherein the instructions for determining and assigning a relevancy score comprise two or more relevancy algorithms that are used to determine one or more of the following relevancy scores: occurrence count score; intro proximity score; first and last occurrence range score; and gap deviation score.

30. The article of claim 29, wherein the two or more relevancy algorithms are from the group consisting of:
determining a first number representing a number of times the term is mentioned in the document;
determining a second number representing a proximity of a first occurrence of the term to the beginning of the document;
determining a third number representing a proximity of a first occurrence of the term to a last occurrence of the term within the document; and
determining a fourth number representing overall changes in a rate of occurrences of the term throughout the document.

31. The article of claim 27, wherein the instructions for determining and assigning a relevancy score comprise instructions adapted to normalize the score using a Gaussian function.

32. The article of claim 27, wherein the set of characteristics includes a number representing a number of times the term is mentioned in the document.

33. The article of claim 27 further comprising instructions for determining a combined relevancy score associated with the entity based on the relevancy score and at least one additional factor.

34. The article of claim 33, wherein the at least one additional factor comprises TFIDF.

35. The article of claim 27 further comprising instructions for determining a plurality of relevancy scores for a plurality of entities and instructions for determining a ranking of the plurality of entities based at least in part on the plurality of relevancy scores and at least one additional factor.

36. The article of claim 35, wherein the at least one additional factor comprises TFIDF.

37. A computer-based system comprising memory and a processor for executing instructions to perform operations, the system comprising:
    input adapted to receive a list comprising a term, the term having been identified as being associated with an electronic document;
    relevancy scoring module adapted to determine a relevancy score associated with the term with respect to the document, the relevancy score being based solely upon a set of characteristics of the document, wherein the set of characteristics includes at least one characteristic from the group consisting of:
        a first number representing a number of sentences occurring in the document prior to a first sentence in which the term appears;
        a second number representing a number of sentences between first and last occurrences of the term within the document; and
        a third number representing a uniformity with which the term occurs within the document; and
    memory for storing the relevancy score.

38. The system of claim 37, wherein the list comprises a second term associated with the document and wherein the relevancy scoring module is further adapted to determine a second relevancy score associated with the second term with respect to the document, the second relevancy score being based solely upon the set of characteristics of the document, and wherein the memory stores the second relevancy score.

39. The system of claim 38, wherein the relevancy scoring module further comprises instructions for generating a ranking based at least in part upon a comparison of the first relevancy score and the second relevancy score.

40. The system of claim 37, wherein the relevancy scoring module comprises instructions associated with two or more relevancy algorithms that are executed by the processor to determine one or more of the following relevancy scores: occurrence count score; intro proximity score; first and last occurrence range score; and gap deviation score.

41. The system of claim 40, wherein the two or more relevancy algorithms are from the group consisting of:
    determining a number representing a number of times the term is mentioned in the document;
    determining a number representing a proximity of a first occurrence of the term to the beginning of the document;
    determining a number representing a proximity of a first occurrence of the term to a last occurrence of the term within the document; and
    determining a number representing overall changes in a rate of occurrences of the term throughout the document.

42. The system of claim 37, wherein the instructions for determining and assigning a relevancy score comprise instructions adapted to normalize the score using a Gaussian function.

43. The system of claim 37 further comprising: an information extraction module adapted to identify and extract terms from the document and wherein the list comprises the identified and extracted terms.

44. The system of claim 37, wherein the relevancy scoring module comprises instructions adapted to determine whether the relevancy score meets a threshold and, if the threshold is met, normalizing the relevancy score.

45. The system of claim 37, wherein the set of characteristics includes a number representing a number of times the term is mentioned in the document.

46. The system of claim 37 further comprising instructions for determining a combined relevancy score associated with the term based on the relevancy score and at least one additional factor.

47. The system of claim 46, wherein the at least one additional factor comprises TFIDF.

48. The system of claim 37, wherein the list comprises a plurality of terms and further comprising instructions for determining a plurality of relevancy scores for the plurality of terms and instructions for determining a ranking of the plurality of terms based at least in part on the plurality of relevancy scores and at least one additional factor.

49. The system of claim 48, wherein the at least one additional factor comprises TFIDF.

* * * * *